(12) United States Patent
Kasuga et al.

(10) Patent No.: US 8,628,842 B2
(45) Date of Patent: Jan. 14, 2014

(54) FIBER-REINFORCED MOLDED PRODUCT AND METHOD FOR MANUFACTURING THE SAME

(75) Inventors: Yosuke Kasuga, Anjo (JP); Yoshinori Sugiura, Anjo (JP)

(73) Assignee: Inoac Corporation, Aichi (JP)

( * ) Notice: Subject to any disclaimer, the term of this patent is extended or adjusted under 35 U.S.C. 154(b) by 0 days.

(21) Appl. No.: 13/498,251

(22) PCT Filed: Jan. 29, 2010

(86) PCT No.: PCT/JP2010/051287
§ 371 (c)(1),
(2), (4) Date: Jun. 11, 2012

(87) PCT Pub. No.: WO2011/052243
PCT Pub. Date: May 5, 2011

(65) Prior Publication Data
US 2012/0237754 A1    Sep. 20, 2012

(30) Foreign Application Priority Data

Oct. 29, 2009    (JP) .................................. 2009-248506

(51) Int. Cl.
*B32B 5/28*    (2006.01)
*C09J 5/06*    (2006.01)
*B29C 65/02*    (2006.01)

(52) U.S. Cl.
USPC .................. 428/308.4; 428/306.6; 156/307.3; 156/60

(58) Field of Classification Search
USPC .................... 428/306.6, 308.4; 156/307.3, 60
See application file for complete search history.

(56) References Cited

U.S. PATENT DOCUMENTS

| 4,764,238 A | 8/1988 | Dastin et al. |
| 5,112,663 A * | 5/1992 | Morenz et al. .................. 428/71 |
| 2004/0043181 A1* | 3/2004 | Sherwood ........................ 428/71 |
| 2008/0241576 A1* | 10/2008 | Le Gall et al. ................ 428/621 |
| 2009/0117366 A1* | 5/2009 | Honma ....................... 428/314.8 |

FOREIGN PATENT DOCUMENTS

| GB | 1 266 097 A | 3/1972 |
| JP | 5369278 A | 6/1978 |
| JP | 57205137 A | 12/1982 |
| JP | 5138797 A | 6/1993 |

(Continued)

OTHER PUBLICATIONS

Translation of JP 2008-207523, Nudeshima et al., Sep. 11, 2008, 16 pages.*

(Continued)

*Primary Examiner* — Hai Vo
(74) *Attorney, Agent, or Firm* — Sughrue Mion, PLLC

(57) ABSTRACT

An object is to provide a fiber-reinforced molded product that is superior in terms of lightness, thinness and high rigidity. A fiber-reinforced molded product has a core material 11 and a fiber-reinforced material 21 provided on both surfaces of the core material 11. The core material 11 is formed by impregnating a thermosetting resin foam having open cells with a first thermosetting resin and curing the thermosetting resin while compressing the impregnated thermosetting resin foam with a compression rate of 200 to 5000. The fiber-reinforced material 21 is formed by impregnating a carbon fiber fabric with a second thermosetting resin and curing the second thermosetting resin. A resin ratio of the first and second thermosetting resins after the impregnation is 50 to 80. The core material 11 and the fiber-reinforced material 21 are formed as a unitary body by curing the first and second thermosetting resins.

12 Claims, 4 Drawing Sheets

(56) References Cited

FOREIGN PATENT DOCUMENTS

| JP | 2004174790 A | 6/2004 |
|---|---|---|
| JP | 2004209717 A | 7/2004 |
| JP | 200635671 A | 2/2006 |
| JP | 200738519 A | 2/2007 |
| JP | 2008207523 A | 9/2008 |
| JP | 2009220478 A | 10/2009 |
| WO | 2006028107 A1 | 3/2006 |

OTHER PUBLICATIONS

International Search Report (PCT/ISA/210) issued on May 11, 2010 in the International Patent Application No. PCT/JP2010/051287.
Office Action dated Apr. 4, 2013 in European Patent Application No. 10826378.1.

* cited by examiner (a)

(b)

(c)

(a)

(b)

(c)

(a)

(b)

(c)

FIBER-REINFORCED MOLDED PRODUCT AND METHOD FOR MANUFACTURING THE SAME

TECHNICAL FIELD

The present invention relates to a fiber-reinforced molded product having a core material and a fiber-reinforced material provided on both surfaces of the core material, and to a method for manufacturing the same.

BACKGROUND ART

In recent years, a light-weight, thin-walled, and highly-rigid member are being demanded as a housing of laptop computers. As a molded product formed with a view to achieving lightness, thinness, and high rigidity, for example, there is a carbon-fiber-reinforced molded product produced by laminating carbon fiber prepregs and curing the laminated carbon fiber prepregs.

However, because the carbon fiber prepregs contain a semi-cured thermosetting resin, the thermosetting resin becomes completely cured in a comparatively short period of time when stored at a normal temperature. For this reason, carbon fiber prepregs are difficult to handle, which raises a problem of an increase in cost for manufacturing a carbon-fiber-reinforced molded product using carbon fiber prepregs.

Patent Document 1 discloses a fiber reinforced product manufactured by stacking a plurality of sheets of fiber reinforced layers, each of the sheets having carbon fibers aligned in the same fiber direction, such that the respective fiber directions are arranged in a specific manner. However, since the fiber reinforced layer having an aligned fiber direction is very expensive, there is a problem of an increase in cost of a fiber-reinforced molded product as the number of fiber reinforced layers is increased. Moreover, the fiber-reinforced molded product has a specific gravity of about 1.6, which had not been sufficient in terms of weight reduction of components of a housing of a laptop or the like.

Patent Document 2 discloses a sandwich structure having a core material including voids, and a fiber reinforced material including continuous carbon fibers and a matrix resin and provided on both surfaces of the core material. However, this has not been sufficient from the viewpoint of thickness reduction and high rigidity required for a housing member of a portable device like a laptop.

Patent Document 1: JP 2004-209717 A
Patent Document 2: WO 2006/028107 A1

SUMMARY OF INVENTION

The present invention has been made in view of above, and an object thereof is to provide a fiber-reinforced molded product that is suitable for a housing and the like of a laptop and other portable devices and is superior in terms of lightness, thinness and high rigidity, and a manufacturing method thereof.

According to the present invention, following are provided.

(1) A fiber-reinforced molded product having a core material and a fiber-reinforced material provided on both surfaces of the core material, wherein the core material is formed by impregnating a thermosetting resin foam having open cells with a first thermosetting resin, and curing the first thermosetting resin while compressing the thermosetting resin foam, the fiber-reinforced material is formed by impregnating a carbon fiber fabric with a second thermosetting resin and curing the second thermosetting resin, a compression rate C expressed by $C=(Tb-Ta)/Ta \times 100$ is 200 to 5000, wherein Ta is the thickness of the thermosetting resin foam after the compressing, and Tb is the thickness of the thermosetting resin foam before the compressing, a resin ratio R expressed by $R=(Wb-Wa)/Wb \times 100$ is 50 to 80, wherein Wa is the total weight of the thermosetting resin foam and the carbon fiber fabric, and Wb is the total weight of the first thermosetting resin, the second thermosetting resin, the thermosetting resin foam, and the carbon fiber fabric, the specific gravity of the fiber-reinforced molded product is 1.2 to 1.5, and the flexural modulus of the fiber-reinforced molded product is 30 GPa to 60 GPa.

(2) The fiber-reinforced molded product according to (1), wherein the thermosetting resin foam is an urethane resin foam or a melamine resin foam.

(3) The fiber-reinforced molded product according to (1), wherein the first thermosetting resin is selected from a group consisting of an epoxy resin, a phenolic resin, and a mixture of the epoxy resin and the phenolic resin.

(4) The fiber-reinforced molded product according to (1), wherein the second thermosetting resin is selected from a group consisting of an epoxy resin, a phenolic resin, and a mixture of the epoxy resin and the phenolic resin.

(5) The fiber-reinforced molded product according to (1), wherein the first thermosetting resin and the second thermosetting resin are the same.

(6) The fiber-reinforced molded product according to (1), wherein the compression rate C is 1000 to 2600.

(7) The fiber-reinforced molded product according to (1), wherein the core material is a mixture of a melamine resin foam and a phenolic resin, the fiber-reinforced material is a mixture of a carbon fiber fabric and a phenolic resin, and is provided as a sheet on each of the surfaces of the core material, and the content of the phenolic resins with respect to the fiber-reinforced molded product is 50 to 80 in terms of the resin ratio R.

(8) A method for manufacturing a fiber-reinforced molded product having a core material and a fiber-reinforced material provided on both surfaces of the core material, the method including:

an impregnation step including impregnating a thermosetting resin foam having open cells with a first thermosetting resin to provide an impregnated thermosetting resin foam;

a laminating step including placing a carbon fiber fabric on both surfaces of the impregnated thermosetting resin foam to provide a laminated body; and a compression heating step including compressing the laminated body to impregnate the carbon fiber fabric with the first thermosetting resin pressed out of the thermosetting resin foam, and heating the laminated body to cure the first thermosetting resin, thereby forming the core material and the fiber-reinforced material as a unitary body, wherein, in the impregnation step, the impregnating with the first thermosetting resin is carried out such that a resin ratio R expressed by $R=(Wb-Wa)/Wb \times 100$ is 50 to 80, wherein Wa is the total weight of the thermosetting resin foam and the carbon fiber fabric, and Wb is the total weight of the first thermosetting resin, the thermosetting resin foam, and the carbon fiber fabric, and wherein the compressing is carried out such that a compression rate C expressed by $C=(Tb-Ta)/Ta \times 100$ is 200 to 5000, wherein Ta is the thickness of the thermosetting resin foam after the compressing, and Tb the thickness of the thermosetting resin foam before the compressing.

(9) A method for manufacturing a fiber-reinforced molded product having a core material and a fiber-reinforced material provided on both surfaces of the core material, the method including:

an impregnation step including impregnating a carbon fiber fabric with a second thermosetting resin to provide an impregnated carbon fiber fabric;

a laminating step including placing the impregnated carbon fiber fabric on both surfaces of a thermosetting resin foam having open cells to provide a laminated body; and a compression heating step including compressing the laminated body to impregnate the thermosetting resin foam with the second thermosetting resin pressed out of the carbon fiber fabric, and heating the laminated body to cure the second thermosetting resin, thereby forming the core material and the fiber-reinforced material as a unitary body, wherein the impregnation step includes adding the second thermosetting resin such that a resin ratio R expressed by R=(Wb−Wa)/Wb×100 is 50 to 80, wherein Wa is the total weight of the thermosetting resin foam and the carbon fiber fabric, and Wb is the total weight of the second thermosetting resin, the thermosetting resin foam, and the carbon fiber fabric, and wherein the compressing is carried out such that a compression rate C expressed by C=(Tb−Ta)/Ta×100 is 200 to 5000, wherein Ta is the thickness of the thermosetting resin foam after the compressing, and Tb is the thickness of the thermosetting resin foam before the compressing.

(10) A method for manufacturing a fiber-reinforced molded product having a core material and a fiber-reinforced material provided on both surfaces of the core material, the method including:

a first impregnation step including impregnating a thermosetting resin foam having open cells with a first thermosetting resin to produce an impregnated thermosetting resin foam;

a second impregnation step including impregnating a carbon fiber fabric with a second thermosetting resin to provide an impregnated carbon fiber fabric;

a laminating step including placing the impregnated carbon fiber fabric on both surfaces of the impregnated thermosetting resin foam to provide a laminated body; and a compression heating step including, in a state in which the first thermosetting resin and the second thermosetting resin are kept in contact with each other by compressing the laminated body, heating the laminated body to form the core material and the fiber-reinforced material as a unitary body, wherein, in the first impregnation step and the second impregnation step, the impregnating with the first thermosetting resin and the impregnating with the second thermosetting resin are carried out such that a resin ratio R expressed by R=(Wb−Wa)/Wb×100 is 50 to 80, wherein Wa is the total weight of the thermosetting resin foam and the carbon fiber fabric, and Wb the total weight of the first thermosetting resin, the second thermosetting resin, the thermosetting resin foam, and the carbon fiber fabric, and wherein the compressing is carried out such that a compression rate C expressed by C=(Tb−Ta)/Ta×100 is 200 to 5000, wherein Ta is the thickness of the thermosetting resin foam after the compressing, and Tb is the thickness of the thermosetting resin foam before the compressing.

(11) The method for manufacturing the fiber-reinforced molded product according to any one of (8) to (10), wherein the compression rate C is 1000 to 2600.

According to a fiber-reinforced molded product of the present invention, the fiber-reinforced material includes a carbon fiber fabric. There are two or more directions of the fibers included in the carbon fiber fabric. Therefore, strength of the fiber-reinforced molded product does not vary depending on a direction. According to the present invention, therefore, it possible to provide a uniform strength without increasing the number of layers, so that the fiber-reinforced molded product can be provided at low cost.

Further, the resin ratio R is 50 to 80, and the core material is produced by curing the first thermosetting resin and/or the second thermosetting resin while compressing the thermosetting resin foam having the open cells such that the compression rate C is 200 to 5000. Therefore, the thickness of the fiber-reinforced molded product can be reduced, and weight reduction and high rigidity can be accomplished.

Moreover, in the thermosetting resin foam having open cells, the adjoining cells (also called bubbles or pores) are interconnected. Therefore, the first thermosetting resin and/or second thermosetting resin uniformly permeates the core material, and is held in the core material. In addition, because the first thermosetting resin and/or second thermosetting resin is cured such that they are bonded to the cell structure of the thermosetting resin foam, strength of the cell structure is improved over the entire thermosetting resin foam. Consequently, there are advantages in terms of improved flexural strength of the fiber-reinforced molded product and improved adhesion between the core material and the fiber-reinforced material.

The present invention does not use prepregs. Therefore, a thermosetting resin does not become cured during storage, so that the thermosetting resin can be stored for a long period of time at a normal temperature. Accordingly, manufacturing cost can be suppressed.

The present invention relating to a method of manufacturing a fiber-reinforced molded product makes it possible to easily produce a fiber-reinforced molded product capable of accomplishing cost reduction, a smaller thickness, lightness, and high rigidity.

EMBODIMENTS OF THE INVENTION

Hereinafter, a fiber-reinforced molded product and a method for manufacturing the same according to the present invention will be described with reference to the drawings.

Figure 1:
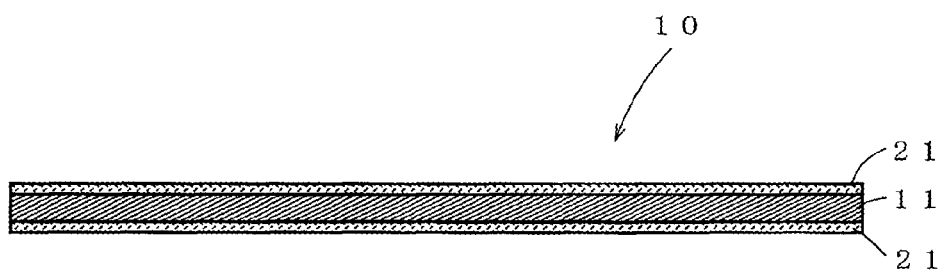
FIG. 1 is a cross sectional view of a fiber-reinforced molded product according to an embodiment of the present invention.

A fiber-reinforced molded product 10 according to an embodiment of the present invention shown in FIG. 1 includes a core material 11 and a fiber-reinforced material 21 layered on and bonded to both surfaces of the core material 11, and is used for a housing of portable device, like a laptop, or the like.

The fiber-reinforced molded product 10 is in a form of a plate having a given size. The fiber-reinforced molded product 10 has a thickness of 0.3 mm to 2.0 mm and a flexural modulus (JIS K 7074-1988 Method A) of 30 GPa to 60 GPa, preferably, 35 GPa to 55 GPa. A specific gravity of the fiber-reinforced molded product 10 is 1.2 to 1.5, preferably, 1.28 to 1.35.

If the thickness of the fiber-reinforced molded product 10 is smaller than 0.3 mm, rigidity cannot be provided, and if is thicker than 2.0 mm, the entire portable device, for instance, becomes thick, so that it is not suitable for use as a housing of portable devices. When forming the fiber-reinforced molded product 10 as a housing of a portable device by so-called outsert molding, such as injection molding, a thermosetting resin, which will be described later, is injected after placing a sidewall or other portions of the housing in position inside a mold.

The core material 11 is formed by impregnating a thermosetting resin foam having open cells with a first thermosetting resin and curing the thermosetting resin while compressing the thermosetting resin foam. The compression rate C described below is 200 to 5000, and more preferably, 1000 to 2600. It is possible to accomplish a smaller thickness and enhanced rigidity of the fiber-reinforced molded product 10 by setting the compression rate C of the thermosetting resin foam within this range.

The compression rate C is expressed by $C=(Tb-Ta)/Ta \times 100$, wherein Ta is the thickness of the compressed thermosetting resin foam (the thickness of the core material 11) and Tb is the thickness of the thermosetting resin foam before the compression.

The thermosetting resin foam having open cells is not particularly limited and can be selected from; for instance, an urethane resin foam and a melamine resin foam. In a case in which the fiber-reinforced molded body 10 is required to have flame retardancy, a flame retardant thermosetting resin foam is preferable as the thermosetting resin foam. In this regard, it is advantageous to use a melamine resin as the thermosetting resin foam, as the melamine resin has superior flame retardancy.

A preferable thickness of the uncompressed thermosetting resin foam varies depending on a target compression rate. For example, it is advantageous to be in a range of 1 mm to 25 mm. When the thickness is within this range, the thermosetting resin foam can be impregnated with a moderate amount of first thermosetting resin, and a yield achieved after heating compression becomes also superior.

When the thickness is smaller than 1 mm, the impregnated first thermosetting resin is not held in the thermosetting resin foam, as a result of which the first thermosetting resin flows out of the thermosetting resin foam, so that a variation resultantly arises in resin ratio. For this reason, a decrease occurs in flexural modulus (rigidity) of a portion of the thermosetting resin foam out of which the first thermosetting resin has flowed, which hinders production of the fiber-reinforced molded product 10 having a uniform flexural modulus. In the meantime, when the thickness is larger than 25 mm and when an attempt is made to produce a fiber-reinforced molded product having a thickness of 2 mm or less, difficulty is encountered in compressing the thermosetting resin foam, which hinders production of a fiber-reinforced molded product having a uniform thickness.

From the viewpoint of ease of compression, impregnating ability, a light-weight property, and rigidity, a density of a thermosetting resin foam before the compression is preferably 5 kg/m$^3$ to 80 kg/m$^3$.

The first thermosetting resin with which the thermosetting resin foam is impregnated is not particularly limited. However, to provide high rigidity of the fiber-reinforced molded product 10, the thermosetting resin itself needs to have a certain degree of rigidity. In view of this, the thermosetting resin may be selected from a group consisting of an epoxy resin, a phenolic resin, and a mixture of an epoxy resin and a phenolic resin. In a case in which the fiber-reinforced molded product 10 is required to have flame retardancy, a flame retardant resin is preferable as the first thermosetting resin. Phenolic resin is preferable as the first thermosetting resin for impregnating the thermosetting resin foam, as it has superior flame retardancy.

The fiber-reinforced material 21 is formed by impregnating a carbon fiber fabric with a second thermosetting resin and curing the second thermosetting resin. The carbon fiber fabric is superior in terms of lightness and high rigidity. A carbon fiber fabric of the present invention refers particularly to a carbon fiber fabric whose fibers are aligned in two directions or more. The carbon fiber fabrics include, for example, a plain fabric, a twill weave, and a sateen weave that are formed from warp threads and weft threads, and a triaxial woven fabric formed from three-way threads. From the viewpoint of impregnation and rigidity of the second thermosetting resin, a fiber weight of the carbon fiber fabric is preferably 90 g/m$^2$ to 400 g/m$^2$.

The second thermosetting resin with which the carbon fiber fabric is impregnated is not particularly limited. However, to provide high rigidity of the fiber-reinforced molded product 10, the thermosetting resin itself needs to have a certain degree of rigidity. In view of this, the thermosetting resin may be selected from a group consisting of an epoxy resin, a phenolic resin, and a mixture of an epoxy resin and a phenolic resin. In a case in which the fiber-reinforced molded product 10 is required to have flame retardancy, a flame retardant resin is preferable as the second thermosetting resin. Phenolic resin is preferable as the thermosetting resin for impregnating the carbon fiber fabric, as it has superior flame retardancy.

It is advantageous to impregnate the thermosetting resin foam and the carbon fiber fabric with the first thermosetting resin and the second thermosetting resin such that a resin ratio R described below is 50 to 80, more particularly, 55 to 70. According to this resin ratio, the fiber-reinforced molded product 10 that is superior in terms of lightness and rigidity can be produced.

The resin ratio R is expressed as $R=(Wb-Wa)/Wb \times 100$, wherein Wa is the total weight of a thermosetting resin foam and a carbon fiber fabric before being impregnated with a thermosetting resin, and Wb is the total weight of an impregnated thermosetting resin (the first and second thermosetting resins), the thermosetting resin foam, and the carbon fiber fabrics.

The post-impregnation weight in the expression of the resin ratio R, in a case in which the thermosetting resin dissolved in a solvent is used, is the weight of the thermosetting resin foam and the carbon fiber fabric after removing the solvent by post-impregnation drying, and as long as the solvent is removed, it may be before or after the bonding of the core material and the reinforcing material.

The core material 11 and the fiber-reinforced material 21 can be formed in a unitary body by curing the thermosetting resin while compressing a laminated body including the thermosetting resin foam impregnated with the thermosetting resin and the carbon fiber fabric impregnated with the thermosetting resin. The thermosetting resin (the first thermosetting resin) for impregnating the thermosetting resin foam and the thermosetting resin (the second thermosetting resin) for impregnating the carbon fiber fabric may be of a same type or different types. However, to provide favorable adhesiveness between the core material 11 and the fiber-reinforced material 21, the same type is preferable.

In the examples described above, the thermosetting resin foam is impregnated with the first thermosetting resin and the fiber-reinforced material is impregnated with the second thermosetting resin. However, (1) without using the second thermosetting resin, the thermosetting resin foam may be impregnated with the first thermosetting resin, and during the compression of the thermosetting resin foam, the fiber-reinforced material may be impregnated with the first thermosetting resin pressed out toward the fiber-reinforced material, or (2) without using the first thermosetting resin, the fiber-reinforced material may be impregnated with the second thermosetting resin, and during the compression of the thermosetting resin foam, the thermosetting resin foam may be impregnated with the second thermosetting resin pressed out toward the thermosetting resin foam.

In the case of (1), the resin ratio R is expressed as R=(Wb−Wa)/Wb×100, wherein Wa is the total weight of a thermosetting resin foam and a carbon fiber fabric before being impregnated with the thermosetting resin, and Wb is the total weight of the first thermosetting resin, the thermosetting resin foam, and the carbon fiber fabric.

In the case of (2), the resin ratio R is expressed as R=(Wb−Wa)/Wb×100, wherein Wa is the total weight of a thermosetting resin foam and a carbon fiber fabric before being impregnated with the thermosetting resin, and Wb is the total weight of the second thermosetting resin, the thermosetting resin foam, and the carbon fiber fabric.

A method for manufacturing the fiber-reinforced molded product of the present invention is now described. The method for manufacturing a fiber-reinforced molded product of the present invention includes an impregnation step, a laminating step, and a compression heating step.

First, a first embodiment of the invention is now described. According to a manufacturing method of the first embodiment, in an impregnation step (a) shown in FIG. 2, a carbon fiber fabric 21A is impregnated with a second thermosetting resin 21B, thereby producing an impregnated carbon fiber fabric 21C. The carbon fiber fabric 21A and the second thermosetting resin 21B are the same as those described in connection with the fiber-reinforced molded product 10. The second thermosetting resin 21B stays in an unset liquid form during impregnation. To facilitate impregnation, it is advantageous to dissolve the second thermosetting resin 21B in a solvent. After the impregnation, the impregnated carbon fiber fabric 21C is dried at a temperature at which the second thermosetting resin 21B is not cured, whereby the solvent is eliminated from the impregnated carbon fiber fabric 21C. The impregnation means can be implemented by an optional method, such as a method for immersing the carbon fiber fabric 21A in a bath where the liquid thermosetting resin 21B is stored, a spraying method, and a roll coating method, or the like.

It is advantageous to impregnate the carbon fiber fabric 21A with the second thermosetting resin 21B such that the resin ratio R becomes 50 to 80, more particularly, 55 to 70.

In the first embodiment, only the carbon fiber fabric 21A is impregnated with the second thermosetting resin 21B in the impregnation step, and a thermosetting resin foam 11A is impregnated with the thermosetting resin 21B permeating the carbon fiber fabric 21A in a compression heating step, as will be described later. Therefore, Wb−Wa in the expression of the resin ratio R is equal to the weight of the second thermosetting resin 21B absorbed by the carbon fiber fabric 21A in the impregnation step. In a case in which the thermosetting resin is used after being dissolved in a solvent, the post-impregnation weight in the expression of the resin ratio is the weight after removing the solvent by post-impregnation drying.

Figure 2:
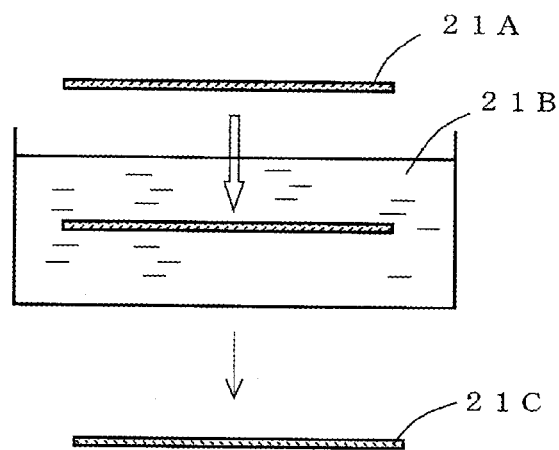
FIG. 2 illustrates steps of a manufacturing method according to a first embodiment of the present invention.
Figure 2:
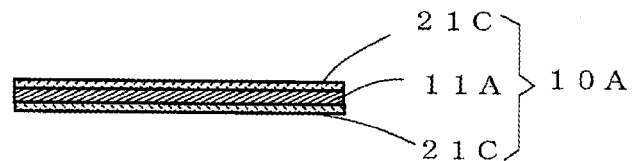
Figure 2:
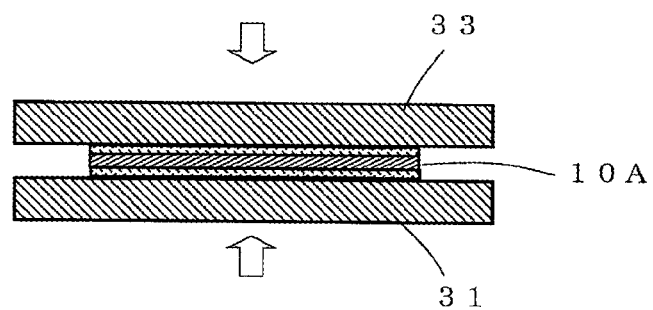

In the laminating step (b) shown in FIG. 2, the impregnated carbon fiber fabric 21C produced in the impregnation step (a) of FIG. 2 is placed on both surfaces of the thermosetting resin foam 11A having open cells, thereby producing a laminated body 10A. The thermosetting resin foam 11A having open cells is the same as that described in connection with the fiber-reinforced molded product 10. The laminating work is performed by placing the impregnated carbon fiber fabric 21C, the thermosetting resin foam 11A, and the impregnated carbon fiber fabric 21C on top of one another in this order, on an upper surface of a lower press molding die 31 to be used in the subsequent compression heating step (c) shown in FIG. 2. It is preferable that the impregnated carbon fiber fabric 21C and the thermosetting resin foam 11A having open cells have the same surface size, but if they are different, trimming can be performed after the compression heating step, which will be described later.

In the compression heating step (c) shown in FIG. 2, the laminated body 10A is heated, and compressed by the lower press molding die 31 and an upper press molding die 33. In the compression heating step, the distance between the lower press molding die 31 and the upper press molding die 33 is adjusted such that the compression rate C becomes 200 to 5000, more preferably, 1000 to 2600.

In the compression heating step, a spacer is placed at an appropriate position between the lower press molding die 31 and the upper press molding die 33, thereby assuring intended spacing between the lower press molding die 31 and the upper press molding die 33. Although a method for heating the laminated body is not particularly limited, it is simple to provide the lower press molding die 31 and the upper press molding die 33 with heating means, such as a heater, thereby heating the laminated body by way of the lower press molding die 31 and the upper press molding die 33. A heating temperature is set so as to become higher than a curing temperature of the second thermosetting resin.

When the laminated body 10A is compressed during the compression heating step, the thermosetting resin foam 11A touching the impregnated carbon fiber fabric 21C is impregnated with the second thermosetting resin pressed out of the impregnated carbon fiber fabric 21C, whereby the entire laminated body 10A is impregnated with the second thermosetting resin. The second thermosetting resin 21B permeating the entire laminated body 10A is cured by heating in a state in which the thermosetting resin foam 11A is compressed. Accordingly, the core material 11 is formed from the thermosetting resin foam 11A. The fiber-reinforced material 21 is formed from the impregnated carbon fiber fabric 21C. The core material 11 and the fiber-reinforced material 21 are bonded together to form the fiber-reinforced molded product 10. Subsequently, heating compression is released, whereby the fiber-reinforced molded product 10 is obtained.

Figure 3:
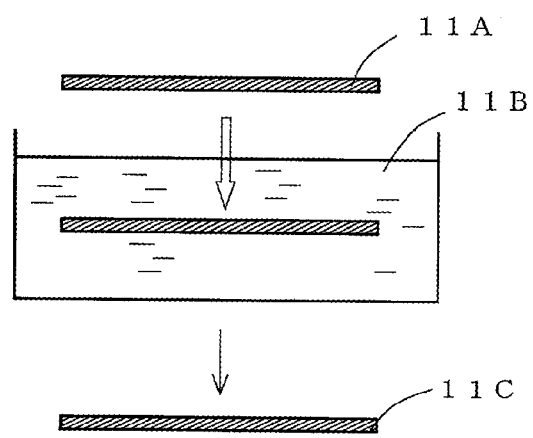
FIG. 3 illustrates steps of a manufacturing method according to a second embodiment of the present invention.
Figure 3:
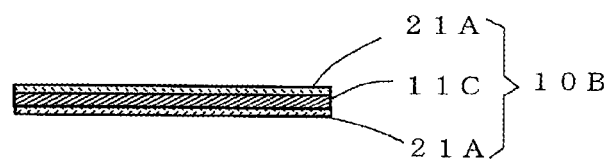
Figure 3:
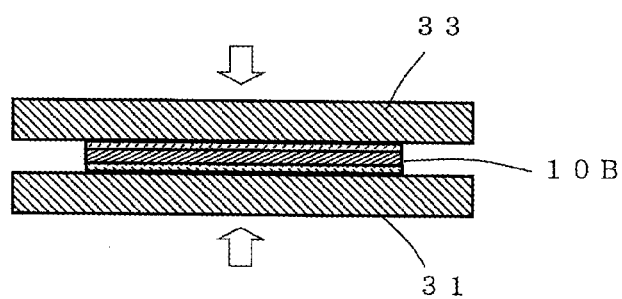

In a second embodiment of the manufacturing method of the present invention, the thermosetting resin foam 11A having open cells is impregnated with a first thermosetting resin 11B, thereby forming an impregnated thermosetting resin foam 11C in the impregnation step (a) shown in FIG. 3. The thermosetting resin foam 11A having the open cells, and the first thermosetting resin 11B are the same as those described in connection with the fiber-reinforced molded product 10. The first thermosetting resin 11B is in uncured liquid form during impregnation. To facilitate impregnation, it is desirable to dissolve the first thermosetting resin 11B in a solvent. After the impregnation, the impregnated thermosetting resin foam 11C is dried at a temperature at which the first thermosetting resin 11B remains uncured, to eliminate the solvent from the impregnated thermosetting resin foam 11C. Impregnation means is implemented by any appropriate method, such as a method for immersing the thermosetting resin foam 11A in a bath where the liquid thermosetting resin 11B is stored, a spraying method, a roll coating method, or the like.

It is advantageous to impregnate the thermosetting resin foam 11A with the first thermosetting resin 11B such that the resin ratio R becomes 50 to 80, more particularly, 55 to 70.

In the second embodiment, only the thermosetting resin foam 11A is impregnated with the first thermosetting resin 11B in the impregnation step, and the carbon fiber fabric 21A is impregnated with the first thermosetting resin 11B permeating the thermosetting resin foam 11A in the compression heating step, as will be described later. Therefore, Wb−Wa in the expression of the resin ratio R is equal to the weight of the first thermosetting resin 11B absorbed by the thermosetting resin foam 11A. In a case in which the first thermosetting resin 11B is used after being dissolved in a solvent, the post-impregnation weight in the expression of the resin ratio R is the weight after removing the solvent by post-impregnation drying.

In the laminating step (b) shown in FIG. 3, the carbon fiber fabric 21A is placed on both surfaces of the impregnated thermosetting resin foam 11C, thereby producing a laminated body 10B. The carbon fiber fabric 21A is the same as the one described in connection with the fiber-reinforced molded product 10. The laminating work can also be performed by placing the carbon fiber fabric 21A, the impregnated thermosetting resin foam 11C, and the carbon fiber fabric 21A on top of one another in this order, on an upper surface of the lower press molding die 31 to be used in the subsequent compression heating step (c) shown in FIG. 3. It is preferable that the impregnated thermosetting resin foam 11C and the carbon fiber fabric 21A have the same surface size, but if they are different, trimming can be performed after the compression heating step, which will be described later.

In the compression heating step (c) shown in FIG. 3, the laminated body 10B is heated, and compressed by the lower press molding die 31 and the upper press molding die 33. In the compression heating step, the distance between the lower press molding die 31 and the upper press molding die 33 is adjusted such that the compression rate C becomes 200 to 5000, more preferably, 1000 to 2600. In the compression heating step, a spacer is placed at an appropriate position between the lower press molding die 31 and the upper press molding die 33, thereby setting spacing between the lower press molding die 31 and the upper press molding die 33 so as to come to intended spacing. Although a method for heating the laminated body is not particularly limited, it is simple to provide the lower press molding die 31 and the upper press molding die 33 with heating means, such as a heater, thereby heating the laminated body by way of the lower press molding die 31 and the upper press molding die 33. A heating temperature is set so as to become higher than a curing temperature of the first thermosetting resin.

When the laminated body 10B is compressed during the compression heating step, the carbon fiber fabric 21A touching the impregnated thermosetting resin foam 11C is impregnated with the first thermosetting resin 11B pressed out of impregnated thermosetting foam 11C of the laminated body 10B, whereby the entire laminated body 10B is impregnated with the first thermosetting resin 11B. The first thermosetting resin 11B permeating the entire laminated body 10B is cured by heating in a state in which the impregnated thermosetting resin foam 11C is compressed. The core material 11 is thereby formed from the impregnated thermosetting resin foam 11C. The fiber-reinforced material 21 is formed from the carbon fiber fabric 21A. The core material 11 and the fiber-reinforced material 21 are bonded together to form the fiber-reinforced molded product 10. Subsequently, heating compression is released, whereby the fiber-reinforced molded product 10 is obtained.

A third embodiment of the manufacturing method of the present invention includes the two impregnation steps described in connection with the first and second embodiments; namely, the impregnation step of impregnating the thermosetting resin foam with the first thermosetting resin (an impregnation step A to be described later) and the impregnation step of impregnating the carbon fiber fabric with the second thermosetting resin (an impregnation step B to be described later).

Figure 4:
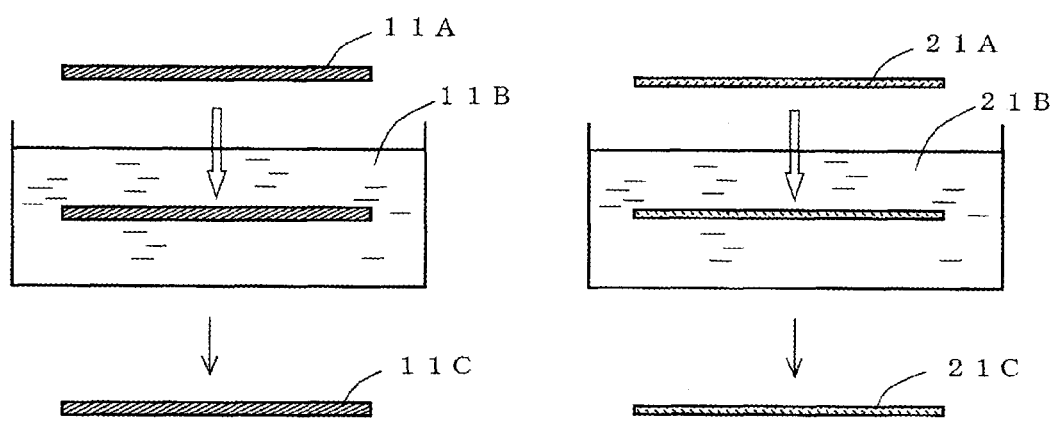
FIG. 4 illustrates steps of a manufacturing method according to a third embodiment of the present invention.
Figure 4:
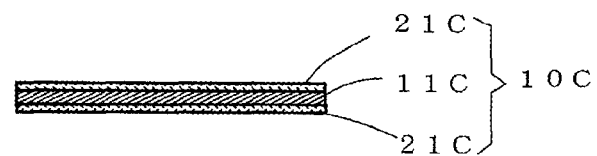
Figure 4:
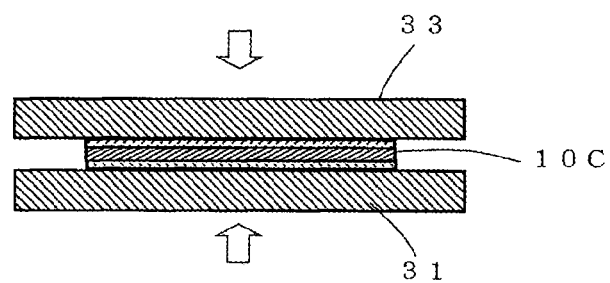

As shown on the left side (a) in FIG. 4, the thermosetting resin foam 11A having open cells is impregnated with the first thermosetting resin 11B in the impregnation step A, thereby forming the impregnated thermosetting resin foam 11C. In the meantime, as shown on the right side of (a) in FIG. 4, the carbon fiber fabric 21A is impregnated with the second thermosetting resin 21B in the impregnation step B, thereby forming the impregnated carbon fiber fabric 21C.

Materials and sizes of the thermosetting resin foam 11A having open cells, the first thermosetting resin 11B, the carbon fiber fabric 21A, and the second thermosetting resin 21B are the same as those described above. A thermosetting resin that is in uncured liquid form during impregnation is used for the first and second thermosetting resins 11B, 21B. To facilitate impregnation, it is advantageous to dissolve the first and second thermosetting resins 11B, 21B in a solvent. After the impregnation, the impregnated thermosetting resin foam 11C and the impregnated carbon fiber fabric 21C are dried at a temperature at which the first and second thermosetting resins 11B, 21B are not cured, thereby eliminating the solvent from the impregnated thermosetting resin foam 11C and the impregnated carbon fiber fabric 21C. The impregnation means can be implemented by an optional method, such as a method for immersing the thermosetting resin foam or the carbon fiber fabric in a bath where the liquid thermosetting resin is stored, a spraying method, and a roll coating method, or the like.

It is advantageous that the quantity of first thermosetting resin 11B with which the thermosetting resin foam 11A is impregnated and the quantity of second thermosetting resin 21B with which the carbon fiber fabric 21A is impregnated are determined such that the resin ratio R becomes 50 to 80, more particularly, 55 to 70.

In the third embodiment, the total weight of the first thermosetting resin 11B absorbed by the thermosetting resin foam 11A and the second thermosetting resin 21B absorbed by the carbon fiber fabric 21A is equal to Wb−Wa in the expression of the resin ratio R. In a case in which the thermosetting resin is used after being dissolved in a solvent, the post-impregnation weight in the expression of the resin ratio R is the weight after removing the solvent by the post-impregnation drying.

In the laminating step (b) in FIG. 4, the impregnated carbon fiber fabric 21C is placed on both surfaces of the impregnated thermosetting resin foam 11C to provide the laminated body 10C. The laminating work may be performed by placing the impregnated carbon fiber fabric 21C, the impregnated thermosetting resin foam 11C, and the impregnated carbon fiber fabric 21C on top of one another in this order, on the upper surface of the lower press molding die 31 to be used in the subsequent compression heating step (c) shown in FIG. 4. It is preferable that the impregnated carbon fiber fabric 21C and the impregnated thermosetting resin foam 11C have the same surface size, but if they are different, trimming can be performed after the compression heating step, which will be described later.

In the compression heating step (c) shown in FIG. 4, the laminated body 10C is heated, and compressed by the lower press molding die 31 and the upper press molding die 33. In the compression step, the compression rate C is 200 to 5000, more preferably, from 1000 to 2600. In the compression heating step, a spacer is placed at an appropriate position between the lower press molding die 31 and the upper press molding die 33, thereby assuring intended spacing between the lower press molding die 31 and the upper press molding die 33. Although a method for heating the laminated body is not particularly limited, it is simple to provide the lower press molding die 31 and the upper press molding die 33 with heating means, such as a heater, thereby heating the laminated body by way of the lower press molding die 31 and the upper press molding die 33. A heating temperature is set so as to become higher than the curing temperature of the first thermosetting resin 11B and the curing temperature of the second thermosetting resin 21B.

By the compression during the compression heating step, the second thermosetting resin 21B of the impregnated carbon fiber fabric 21C and the first thermosetting resin 11B of the impregnated thermosetting resin foam 11C are firmly brought into contact with each other. By the heating during the compression heating step, the first thermosetting resin 11B of the impregnated thermosetting resin foam 11C and the second thermosetting resin 21B of the impregnated carbon fiber fabric 21C are cured in a state in which the impregnated thermosetting resin foam 11C is compressed. The core material 11 is formed from the impregnated thermosetting resin foam 11C, and the fiber-reinforced material 21 is formed from the impregnated carbon fiber fabric 21C. The core material 11 and the fiber-reinforced material 21 are bonded together, whereby the fiber-reinforced molded product 10 is formed. Subsequently, heating and compressing operation is released, whereby the fiber-reinforced molded product 10 is obtained.

EXAMPLES

Example 1

A phenolic resin (a mixture of PAPS-4, a product made by Asahi Organic Chemicals Industry Co. Ltd., and Hexamethylenetetramine, a product made by Asahi Organic Chemicals Industry Co. Ltd. at a ratio of 100:12) was dissolved as the first and second thermosetting resins into methanol to a 30 weight percent concentration. A plain carbon fiber fabric (W-3101, a product made by Toho Tenax Co. Ltd. and having a fiber weight of 200 g/m2) was immersed in a phenolic resin solution. The woven fabric picked out of the solution was air-dried for two hours at room temperature of 25° C. Further, the dried woven fabric was dried for one hour in an atmosphere at 60° C., whereby two sheets of impregnated carbon fiber fabric were produced. The carbon fiber fabric was cut into a surface size of 200×300 mm (a weight of 12 g per sheet). Each of the dried, impregnated carbon fiber fabric had a weight of 28 g per sheet.

A melamine resin foam (Basotect V3012, a product made by BASF Ltd. and having a density of 9 kg/m3) was cut to a thickness of 10 mm and a surface size of 200×300 mm (a weight of 5.4 g) as a thermosetting resin foam having open cells. The cut melamine resin foam was immersed in the phenolic resin solution in the same manner as was the carbon fiber fabric. The resin foam was picked out of the solution and air-dried for two hours at a room temperature of 25° C. The dried resin foam was dried for one hour in an atmosphere of 60° C., thereby producing an impregnated thermosetting resin foam. A weight of the dried, impregnated thermosetting resin foam was 27 g. Further, a resin ratio R achieved in Example 1 was 65.

The impregnated carbon fiber fabric, the impregnated thermosetting resin foam, and the impregnated carbon fiber fabric were then superimposed, in this sequence, on a lower press molding die made of stainless steel (having a planar shape) whose surface was previously coated with a mold release agent. A laminated body including the impregnated carbon fiber fabric placed on either side of the impregnated thermosetting resin foam was set on the lower press molding die. In this state, the laminated body on the lower press molding die was pressed by the upper press molding die (having a planar shape) at 180° C. for three minutes with contact pressure of 5 MPa. The laminated body was compressed and heated in this state, and the phenolic resin (the first and second thermosetting resins) was cured in a compressed state. The Heating operation was performed by means of cast-in heaters attached to the respective upper and lower press molding dies. A spacer made of stainless steel having a thickness of 0.9 mm was interposed between the lower press molding die and the upper press molding die, whereby spacing between the upper and lower press molding dies was adjusted, to adjust a compressed thickness of the laminated body. Subsequently, the lower and upper press molding dies were cooled at room temperature, and the molds were opened up. A fiber-reinforced molded product including the fiber-reinforced material bonded to the respective surfaces of the core material in a layered manner was produced. The fiber-reinforced molded product was trimmed to 170×260 mm, to produce the fiber-reinforced molded product described in connection with Example 1.

The fiber-reinforced molded product of Example 1 was measured in relation to a specific gravity and entire thickness thereof and a thickness of the core material. The specific gravity was 1.30, the entire thickness of the fiber-reinforced molded product was 0.89 mm, and the thickness of the core material was 0.43 mm. The compression rate C of the thermosetting resin foam of the core material was calculated as 2225, using the thickness (10 mm) of the uncompressed thermosetting resin foam and the thickness (0.43 mm) of the core material (the thickness of the compressed thermosetting resin foam). Further, with respect to the fiber-reinforced molded product of Example 1, the flexural modulus (JIS K 7074-1988 Method A) was measured to evaluate rigidity. As a result of the measurement result, the flexural modulus was 50 GPa (with respect to the fiber direction).

Example 2

The fiber-reinforced molded product of Example 2 was produced in the same manner as in Example 1 (the resin ratio R was also 65 as in Example 1), except that the thickness of the thermosetting resin foam having open cells was 5 mm.

The fiber-reinforced molded product of Example 2 was measured in view of a specific gravity and entire thickness thereof and a thickness of a core material. The specific gravity was 1.29; the entire thickness was 0.89 mm; and the thickness of the core material was 0.43 mm. The compression rate C of the thermosetting resin foam of the core material was calculated as 1062, using the thickness (5 mm) of the uncompressed thermosetting resin foam and the thickness (0.43 mm) of the core material (the thickness of the compressed thermosetting resin foam). Further, with respect to the fiber-reinforced molded product of Example 2, the flexural modulus (JIS K 7074-1988 Method A) was measured to evaluate rigidity. As a result of the measurement, the flexural modulus was 49 GPa (with respect to the fiber direction).

Example 3

The fiber-reinforced molded product of Example 3 was produced in the same manner as in Example 1 (the resin ratio R was also 65 as in Example 1), except that the thickness of the thermosetting resin foam having open cells was 11.5 mm.

The fiber-reinforced molded product of Example 3 was measured in relation to a specific gravity and entire thickness thereof and a thickness of a core material. The specific gravity was 1.32, the entire thickness was 0.9 mm, and the thickness of the core material was 0.44 mm. The compression rate C of the thermosetting resin foam of the core material was calculated as 2513, using the thickness (11.5 mm) of the uncompressed thermosetting resin foam and the thickness (0.44 mm) of the core material (the thickness of the compressed thermosetting resin foam). Further, with respect to the fiber-reinforced molded product of Example 3, the flexural modulus (JIS K 7074-1988 Method A) was measured to evaluate rigidity. As a result of the measurement, the flexural modulus was 51 GPa (with respect to the fiber direction).

Example 4

The fiber-reinforced molded product of Example 4 was produced in the same manner as in Example 1 (the resin ratio R was also 65 as in Example 1), except that the thickness of the thermosetting resin foam having open cells was 1.4 mm.

The fiber-reinforced molded product of Example 4 was measured in relation to its specific gravity and entire thickness thereof and a thickness of a core material. The specific gravity was 1.28, the entire thickness was 0.89 mm, and the thickness of the core material was 0.43 mm. The compression rate C of the thermosetting resin foam of the core material was calculated as 225, using the thickness (1.4 mm) of the uncompressed thermosetting resin foam and the thickness (0.43 mm) of the core material (the thickness of the compressed thermosetting resin foam). Further, with respect to the fiber-reinforced molded product of Example 4, the flexural modulus (JIS K 7074-1988 Method A) was measured to evaluate rigidity. As a result of the measurement, the flexural modulus was 46 GPa (with respect to the fiber direction).

Example 5

The fiber-reinforced molded product of Example 5 was produced in the same manner as in Example 1 (the resin ratio R was also 65 as in Example 1), except that the thickness of the thermosetting resin foam having open cells was 22 mm.

The fiber-reinforced molded product of Example 5 was measured in relation to its specific gravity and entire thickness thereof and a thickness of a core material. The specific gravity was 1.35, the entire thickness was 0.9 mm, and the thickness of the core material was 0.44 mm. The compression rate C of the thermosetting resin foam of the core material was calculated as 4900, using the thickness (22 mm) of the uncompressed thermosetting resin foam and the thickness (0.44 mm) of the core material (the thickness of the compressed thermosetting resin foam). Further, with respect to the fiber-reinforced molded product of Example 5, the flexural modulus (JIS K 7074-1988 Method A) was measured to evaluate rigidity. As a result of the measurement, the flexural modulus was 51 GPa (with respect to the fiber direction).

Example 6

The fiber-reinforced molded product of Example 6 was produced in the same manner as in Example 1, except that the carbon fiber fabric was impregnated with a phenolic resin solution such that a sheet of dried, impregnated carbon fiber fabric had a weight of 35 g after drying, that the thermosetting resin foam was impregnated with the phenolic resin solution such that a sheet of impregnated thermosetting resin foam had a weight of 45 g after drying; and that the entire resin ratio R of the carbon fiber fabric and the thermosetting resin foam was 74.

The fiber-reinforced molded product of Example 6 was measured in relation to a specific gravity and entire thickness thereof and a thickness of a core material. The specific gravity was 1.45, the entire thickness was 0.98 mm, and the thickness of the core material was 0.52 mm. The compression rate C of the thermosetting resin foam of the core material was calculated as 1823, using the thickness (10 mm) of the uncompressed thermosetting resin foam and the thickness (0.52 mm) of the core material (the thickness of the compressed thermosetting resin foam). Further, with respect to the fiber-reinforced molded product of Example 6, the flexural modulus (JIS K 7074-1988 Method A) was measured to evaluate rigidity of the fiber-reinforced molded product. As a result of the measurement, the flexural modulus was 55 GPa (with respect fiber direction).

Example 7

The fiber-reinforced molded product of Example 6 was produced in the same manner as in Example 1, except that the carbon fiber fabric was impregnated with a phenolic resin solution such that a sheet of dried, impregnated carbon fiber fabric had a weight of 22 g after drying; that the thermosetting resin foam was impregnated with the phenolic resin solution such that a sheet of impregnated thermosetting resin foam had a weight of 16 g after drying; and that the entire resin ratio R of the carbon fiber fabric and the thermosetting resin foam was 51.

The fiber-reinforced molded product of Example 7 was measured in relation to a specific gravity and entire thickness thereof and a thickness of a core material. The specific gravity was 1.30, the entire thickness was 0.89 mm, and the thickness of the core material was 0.43 mm. The compression rate C of the thermosetting resin foam of the core material was calculated as 2225, using the thickness (10 mm) of the uncompressed thermosetting resin foam and the thickness (0.43 mm) of the core material (the thickness of the compressed thermosetting resin foam). Further, with respect to the fiber-reinforced molded product of Example 7, the flexural modulus (JIS K 7074-1988 Method A) was measured to evaluate rigidity. As a result of the measurement, the flexural modulus was 45 GPa (with respect to the fiber direction).

Example 8

The fiber-reinforced molded product of Example 8 was produced in the same manner as in Example 1, except that the thermosetting resin foam was not impregnated with the thermosetting resin, that only the carbon fiber fabric was impregnated with the phenolic resin solution as a thermosetting resin such that the weight of an impregnated thermosetting resin foam achieved after drying came to 40 g, and that the resin ratio R of the carbon fiber fabric was 66.

The fiber-reinforced molded product of Example 8 was measured in relation to a specific gravity and entire thickness thereof and a thickness of a core material. The specific gravity was 1.30, the entire thickness was 0.89 mm, and the thickness of the core material was 0.43 mm. The compression rate C of the thermosetting resin foam of the core material was calculated as 2225, using the thickness (10 mm) of the uncompressed thermosetting resin foam and the thickness (0.43 mm) of the core material (the thickness of the compressed thermosetting resin foam). Further, with respect to the fiber-reinforced molded product of Example 8, the flexural modulus (JIS K 7074-1988 Method A) was measured to evaluate rigidity. As a result of the measurement, the flexural modulus was 50 GPa (with respect to the fiber direction).

Example 9

The fiber-reinforced molded product of Example 9 was produced in the same manner as in Example 1, except that the carbon fiber fabric was not impregnated with a resin, that only the thermosetting resin foam was immersed in the phenolic resin solution as a thermosetting resin such that an impregnated thermosetting resin foam had a weight of 40 g after drying, and that the resin ratio R of the thermosetting resin foam was 54.

The fiber-reinforced molded product of Example 9 was measured in relation to a specific gravity and entire thickness thereof and a thickness of a core material. The specific gravity was 1.30, the entire thickness was 0.89 mm, and the thickness of the core material was 0.43 mm. The compression rate C of the thermosetting resin foam of the core material was calculated as 2225, using the thickness (10 mm) of the uncompressed thermosetting resin foam and the thickness (0.43 mm) of the core material (the thickness of the compressed thermosetting resin foam). Further, with respect to the fiber-reinforced molded product of Example 9, the flexural modulus (JIS K 7074-1988 Method A) was measured to evaluate rigidity. As a result of the measurement, the flexural modulus was 46 GPa (with respect to the fiber direction).

Example 10

The fiber-reinforced molded product of Example 10 was produced in the same manner as in Example 1, except that an urethane resin foam (Moltopren MF80 produced by Inoac Corporation and having a density of 72 kg/m$^3$) was used as a thermosetting resin foam having open cells, and that an amount of first thermosetting resin with which the thermosetting resin foam is impregnated was adjusted such that a resin ratio R is 65.

The fiber-reinforced molded product of Example 10 was measured in relation to a specific gravity and entire thickness thereof and a thickness of a core material. The specific gravity was 1.35, the entire thickness was 0.9 mm, and the thickness of the core material was 0.44 mm. The compression rate C of the thermosetting resin foam of the core material was calculated as 2172, using the thickness (10 mm) of the uncompressed thermosetting resin foam and the thickness (0.44 mm) of the core material (the thickness of the compressed thermosetting resin foam). Further, with respect to the fiber-reinforced molded product of Example 10, the flexural modulus (JIS K 7074-1988 Method A) was measured to evaluate rigidity. As a result of the measurement, the flexural modulus was 35 GPa (with respect to the fiber direction).

Example 11

The fiber-reinforced molded product of Example 11 was produced in the same manner as in Example 1 (the resin ratio R was also 65), except that an epoxy resin (a mixture of Epiclon 850 a product made by DIC Corporation, and WH-108S, a product made by DIC Corporation in a ratio of 100:30) was used as a thermosetting resin.

The fiber-reinforced molded product of Example 11 was measured in relation to a specific gravity and entire thickness thereof and a thickness of a core material. The specific gravity was 1.30, the entire thickness was 0.89 mm, and the thickness of the core material was 0.43 mm. The compression rate C of the thermosetting resin foam of the core material was calculated as 2225, using the thickness (10 mm) of the uncompressed thermosetting resin foam and the thickness (0.43 mm) of the core material (the thickness of the compressed thermosetting resin foam). Further, with respect to the fiber-reinforced molded product of Example 11, the flexural modulus (JIS K 7074-1988 Method A) was measured to evaluate rigidity. As a result of the measurement, the flexural modulus was 49 GPa (with respect to the fiber direction).

Comparative Example 1

A fiber-reinforced molded product of Comparative Example 1 was produced in the same manner as in Example 1 (the resin ratio R was also 65), except that the thickness of the thermosetting resin foam having open cells was 0.95 mm.

The fiber-reinforced molded product of Comparative Example 1 was measured in relation to a specific gravity and entire thickness thereof and a thickness of a core material. The specific gravity was 1.29, the entire thickness was 0.89 mm, and the thickness of the core material was 0.43 mm. The compression rate C of the thermosetting resin foam of the core material was calculated as 121, using the thickness (0.95 mm) of the uncompressed thermosetting resin foam and the thickness (0.43 mm) of the core material (the thickness of the compressed thermosetting resin foam). Further, with respect to the fiber-reinforced molded product of Comparative Example 1, the flexural modulus (JIS K 7074-1988 Method A) was measured to evaluate rigidity. As a result of the measurement, the flexural modulus was 25 GPa (with respect to the fiber direction). When compared with the respective Examples described above, the thickness of the uncompressed thermosetting resin foam was small, so that the compression rate was low. Hence, the flexural modulus (rigidity) was low.

Comparative Example 2

A fiber-reinforced molded product of Comparative Example 2 was molded in the same manner as in Example 1 (the resin ratio R was also 65), except that the thickness of the thermosetting resin foam having open cells was 30 mm. However, the thickness of the thermosetting resin foam was too large and hence could not be compressed sufficiently. Only a fiber-reinforced molded product including large variations in thickness was produced.

The compression rate C of Comparative Example 2 was calculated as 6877, assuming that the thickness of the core material of Comparative Example 2 is identical to the thickness (0.43 mm) of the core material produced in Example 1 due to the large variations in thickness, and by using the compression rate expression and the thickness (30 mm) of the uncompressed thermosetting resin foam. Because the compression rate exceeds 5000, a favorable fiber-reinforced molded product was not produced in Comparative Example 2.

Comparative Example 3

Instead of the thermosetting resin foam having open cells, an urethane resin foam including closed cells (Surmax, a product made by Inoac Corporation and having a density of 30 kg/m³) was using after being cut into a size of 200×300× the thickness of 5 mm (a weight of 9 g). The fiber-reinforced molded product of Comparative Example 3 was produced in the same manner as in Example 8, except that the entire resin ratio R inside the thermosetting foam and the carbon fiber fabric was 57.

The fiber-reinforced molded product of Comparative Example 3 was measured in relation to a specific gravity and entire thickness thereof and a thickness of a core material. The specific gravity was 1.29, the entire thickness was 0.90 mm, and the thickness of the core material was 0.44 mm. The compression rate C of the thermosetting resin foam of the core material was calculated as 1036, using the thickness (5 mm) of the uncompressed thermosetting resin foam and the thickness (0.44 mm) of the core material (the thickness of the compressed thermosetting resin foam). Further, with respect to the fiber-reinforced molded product of Comparative Example 3, the flexural modulus (JIS K 7074-1988 Method A) was measured to evaluate rigidity. As a result of the measurement, the flexural modulus was 22 GPa (with respect to the fiber direction). Because the foam including closed cells was used as the core material, the thermosetting resin was not uniformly dispersed and held in the core material. When compared with the respective Examples, the flexural modulus (rigidity) was low.

Comparative Example 4

A fiber-reinforced molded product of Comparative Example 4 was produced in the same manner as in Example 1, except that the resin ratio R was 45.

The fiber-reinforced molded product of Comparative Example 4 was measured in relation to a specific gravity and entire thickness thereof and a thickness of a core material. The specific gravity was 1.29, the entire thickness was 0.89 mm, and the thickness of the core material was 0.43 mm. The compression rate C of the thermosetting resin foam of the core material was calculated as 2225, using the thickness (10 mm) of the uncompressed thermosetting resin foam and the thickness (0.43 mm) of the core material (the thickness of the compressed thermosetting resin foam). Further, with respect to the fiber-reinforced molded product of Comparative Example 4, the flexural modulus (JIS K 7074-1988 Method A) was measured to evaluate rigidity. As a result of the measurement, the flexural modulus was 27 GPa (with respect to the fiber direction). As the resin ratio was too low, the amount of thermosetting resin included was small as compared with the respective Examples, and the flexural modulus (rigidity) was low.

Comparative Example 5

A fiber-reinforced molded product of Comparative Example 5 was produced in the same manner as in Example 1, except that the resin ratio R was 85. However, because the resin ratio R was too high, the amount of thermosetting resin included in the carbon fiber fabric and the thermosetting resin foam was excessively large, so that sufficient compression could not be performed. Thus, only a fiber-reinforced molded product having large variations in thickness was produced.

Table 1 shows compression rates, resin ratios, specific gravity, entire thicknesses, and flexural moduli of the respective Examples and the respective Comparative Examples.

TABLE 1

|  | Compression Rate C | Resin Ratio R | Specific Gravity | Thickness [mm] | Flexural Modulus [GPa] |
| --- | --- | --- | --- | --- | --- |
| Example 1 | 2225 | 65 | 1.30 | 0.89 | 50 |
| Example 2 | 1062 | 65 | 1.29 | 0.89 | 49 |
| Example 3 | 2513 | 65 | 1.32 | 0.90 | 51 |
| Example 4 | 225 | 65 | 1.28 | 0.89 | 46 |
| Example 5 | 4900 | 65 | 1.35 | 0.90 | 51 |
| Example 6 | 1823 | 74 | 1.45 | 0.98 | 55 |
| Example 7 | 2225 | 51 | 1.30 | 0.89 | 45 |
| Example 8 | 2225 | 66 | 1.30 | 0.89 | 50 |
| Example 9 | 2225 | 54 | 1.30 | 0.89 | 46 |
| Example 10 | 2172 | 65 | 1.35 | 0.90 | 35 |
| Example 11 | 2225 | 65 | 1.30 | 0.89 | 49 |
| Comparative Example 1 | 121 | 65 | 1.29 | 0.89 | 25 |
| Comparative Example 2 |  |  |  |  |  |
| Comparative Example 3 | 1036 | 57 | 1.29 | 0.90 | 22 |
| Comparative Example 4 | 2225 | 45 | 1.29 | 0.89 | 27 |
| Comparative Example 5 |  |  |  |  |  |

In Table 1, Examples 1-5 show that the thermosetting resin foam and the carbon fiber fabric are of the same type and have the same resin ratio. Among them, Example 4 having a low compression rate of 225 has a lower flexural modulus (rigidity) than other Examples. In the meantime, Example 5 having a high compression rate of 4900 has high (heavy) specific gravity. Thus, there is a tendency showing that the lower the compression rate, the lower the flexural modulus (rigidity). In the meantime, there is also a tendency showing that the higher the compression rate, the higher (heavier) specific gravity. In view of these, the compression rate is 200 to 5000, more preferably, 1000 to 2600.

Examples 1, 7-9 and Comparative Example 4 show that the thermosetting resin foam and the carbon fiber fabric are of the same type and have the same compression rate. Among them, Comparative Example 4 having a resin ratio of 45 has a small flexural modulus of 27 GPa, whilst Example 8 having a resin ratio of 66 has a high flexural modulus of 50 GPa. Therefore, it is seen that, the higher the resin ratio, the higher the flexural modulus (the rigidity). Since larger rigidity is much better, a higher resin ratio is more desirable.

When comparing Examples 1, 7-9 and Comparative Example 4 with Example 6, their compression rates are substantially the same. However, Example 6 has a resin ratio R of 74 and a specific gravity of 1.45, which are both high. The Comparative Example 4 having a resin ratio of 45 has a specific gravity of 1.29, and Example 7 having a resin ratio of 51 has a specific gravity of 1.30. Therefore, a tendency is understood to show that the higher resin ratio, the heavier the specific gravity. Since lighter specific gravity makes it possible to reduce the weight of the fiber-reinforced molded product, a smaller resin ratio is preferable.

Consequently, considering both rigidity and light weight, a resin ratio is preferably 50 to 80, and more preferably, 55 to 70.

As such, products according to embodiments of the present invention are superior in terms of lightness, thinness and high rigidity, and are suitable as a housing or the like of portable devices such as laptops.

While the present invention has been described in detail with reference to certain embodiments thereof, it is apparent for those skilled in the art that various changes and modifications can be made therein without departing from the spirit and scope of the present invention.

The present patent application is based on Japanese Patent Application No. 2009-248506 filed on Oct. 29, 2009, the entire content of which is incorporated herein by reference.

According to the present invention, a fiber-reinforced molded product having uniform strength can be provided without increasing the number of layers. Therefore, a thin, lightweight, and highly rigid fiber-reinforced molded product can be provided.

EXPLANATION OF REFERENCE NUMERALS

10 Fiber-Reinforced Molded Product
10A, 10B, 10C Laminated Body
11 Core Material
11A Thermosetting Resin Foam
11B Thermosetting Resin
11C Impregnated Thermosetting Resin Foam
21 Fiber-Reinforced Material
21A Carbon Fiber Fabric
21B Thermosetting Resin
21C Impregnated Carbon Fiber Fabric

The invention claimed is:

1. A fiber-reinforced molded product comprising a core material and a fiber-reinforced material layered on both surfaces of the core material,
wherein the core material is formed by impregnating a thermosetting resin foam having open cells with a thermosetting resin, and curing the thermosetting resin while compressing the thermosetting resin foam, wherein a compression rate defined by the formula (A1) below is in a range of 200 to 5000%
the fiber-reinforced material is formed by impregnating a carbon fiber fabric with a thermosetting resin and curing the thermosetting resin,
a resin ratio, defined by the formula (B1) below, of the thermosetting resins with which the thermosetting resin foam and the carbon fiber fabric are impregnated is in a range of 50 to 80%,
the core material and the fiber-reinforced material are formed as a unitary body by the curing of the thermosetting resin with which the thermosetting resin foam is impregnated and the thermosetting resin with which the fiber-reinforced material is impregnated, and
a flexural modulus of the fiber-reinforced molded product is 30 GPa to 60 GPa:
(A1) compression rate={(thickness of thermosetting resin foam before compressing −thickness of core material)/thickness of core material}×100; and
(B1) resin ratio={(total weight of thermosetting resin foam and carbon fiber fabric after impregnating with thermosetting resins−total weight of thermosetting resin foam and carbon fiber fabric before impregnating with thermosetting resins)/total weight of thermosetting resin foam and carbon fiber fabric after impregnating with thermosetting resins}×100, and
further wherein the fiber-reinforced molded product has a specific gravity of 1.2 to 1.5 and a thickness of 0.3 mm to 2.0 mm.

2. The fiber-reinforced molded product according to claim 1, wherein the thermosetting resin foam is an urethane resin foam or a melamine resin foam.

3. The fiber-reinforced molded product according to claim 1, wherein the thermosetting resin with which the thermosetting resin foam is impregnated is selected from a group consisting of an epoxy resin, a phenolic resin, and a mixture of the epoxy resin and the phenolic resin.

4. The fiber-reinforced molded product according to claim 1, wherein the thermosetting resin with which the carbon fiber fabric is impregnated is selected from a group consisting of an epoxy resin, a phenolic resin, and a mixture of the epoxy resin and the phenolic resin.

5. The fiber-reinforced molded product according to claim 1, wherein the thermosetting resin with which the thermosetting resin foam is impregnated and the thermosetting resin with which the carbon fiber fabric is impregnated are the same.

6. The fiber-reinforced molded product according to claim 1, wherein the compression rate defined by the formula (A1) is 1000 to 2600%.

7. A method for manufacturing a fiber-reinforced molded product according to claim 1, having a core material and a fiber-reinforced material layered on both surfaces of the core material, the core material being formed by impregnating a thermosetting resin foam having open cells with a thermosetting resin, and curing the thermosetting resin while compressing the thermosetting resin foam, and the fiber-reinforced material being formed by impregnating a carbon fiber fabric with a thermosetting resin and curing the thermosetting resin, the method comprising:
an impregnation step including impregnating a carbon fiber fabric with a thermosetting resin to provide an impregnated carbon fiber fabric;
a laminating step including placing the impregnated carbon fiber fabric on both surfaces of a thermosetting resin foam having open cells to provide a laminated body; and
a compression heating step including compressing and heating the laminated body,
wherein, in the impregnation step, the impregnating is carried out such that a resin ratio defined by the formula (B2) below is in a range of 50 to 80%,
wherein, in the compression heating step, the compressing is carried out such that a compression rate defined by the formula (A2) below is 200 to 5000%, and
wherein the compression heating step includes impregnating the thermosetting resin foam with the thermosetting resin pressed out of the carbon fiber fabric, and causing a curing reaction in the thermosetting resin to form the core material and the fiber-reinforced material, thereby forming the core material and the fiber-reinforced material as a unitary body:
(B2) resin ratio={(total weight of thermosetting resin foam and carbon fiber fabric after impregnating with thermosetting resins−total weight of thermosetting resin foam and carbon fiber fabric before impregnating with thermosetting resins)/total weight of thermosetting resin foam and carbon fiber fabric after impregnating with thermosetting resins}×100; and
(A2) compression rate={(thickness of thermosetting resin foam before compressing −thickness of core material)/thickness of core material}×100.

8. The method for manufacturing the fiber-reinforced molded product according to claim 7, wherein the compression rate of the thickness of thermosetting resin foam is 1000 to 2600%.

9. A method for manufacturing a fiber-reinforced molded product according to claim 1, having a core material and a fiber-reinforced material layered on both surfaces of the core material, the core material being formed by impregnating a thermosetting resin foam having open cells with a thermosetting resin, and curing the thermosetting resin while compressing the thermosetting resin foam, and the fiber-reinforced material being formed by impregnating a carbon fiber fabric with a thermosetting resin and curing the thermosetting resin, the method comprising:
- an impregnation step including impregnating a thermosetting resin foam having open cells with a thermosetting resin to provide an impregnated thermosetting resin foam;
- a laminating step including placing a carbon fiber fabric on both surfaces of the impregnated thermosetting resin foam to provide a laminated body; and
- a compression heating step including compressing and heating the laminated body,
- wherein, in the impregnation step, the impregnating is carried out such that a resin ratio defined by the formula (B3) below is in a range of 50 to 80%,
- wherein, in the compression heating step, the compressing is carried out such that a compression rate defined by the formula (A3) below is 200 to 5000%, and
- wherein the compression heating step includes impregnating the carbon fiber fabric with the thermosetting resin pressed out of the thermosetting resin foam, and causing a curing reaction in the thermosetting resin to form the core material and the fiber-reinforced material, thereby forming the core material and the fiber-reinforced material as a unitary body:
- (B3) resin ratio={(total weight of thermosetting resin foam and carbon fiber fabric after impregnating with thermosetting resins−total weight of thermosetting resin foam and carbon fiber fabric before impregnating with thermosetting resins)/total weight of thermosetting resin foam and carbon fiber fabric after impregnating with thermosetting resins}×100; and
- (A3) compression rate={(thickness of thermosetting resin foam before compressing −thickness of core material)/thickness of core material}×100.

10. The method for manufacturing the fiber-reinforced molded product according to claim 9, wherein the compression rate of the thickness of thermosetting resin foam is 1000 to 2600%.

11. A method for manufacturing a fiber-reinforced molded product according to claim 1, having a core material and a fiber-reinforced material layered on both surfaces of the core material, the core material being formed by impregnating a thermosetting resin foam having open cells with a thermosetting resin, and curing the thermosetting resin while compressing the thermosetting resin foam, and the fiber-reinforced material being formed by impregnating a carbon fiber fabric with a thermosetting resin and curing the thermosetting resin, the method comprising:
- an impregnation step A including impregnating a thermosetting resin foam having open cells with a thermosetting resin A to produce an impregnated thermosetting resin foam;
- an impregnation step B including impregnating a carbon fiber fabric with a thermosetting resin B to provide an impregnated carbon fiber fabric;
- a laminating step including placing the impregnated carbon fiber fabric on both surfaces of the impregnated thermosetting resin foam to provide a laminated body; and
- a compression heating step including compressing and heating the laminated body,
- wherein, in the impregnation step A and the impregnation step B, the impregnating is carried out such that a resin ratio defined by the formula (B4) below is in a range of 50 to 80%,
- wherein, in the compression heating step, the compressing is carried out such that a compression rate defined by the formula (A4) below is 200 to 5000%, and
- wherein the compression heating step includes causing a curing reaction in the thermosetting resin A with which the thermosetting resin foam is impregnated and in the thermosetting resin B with which the carbon fiber fabric is impregnated while keeping them in contact with each other, thereby forming the core material and the fiber-reinforced material as a unitary body:
- (B4) resin ratio={(total weight of thermosetting resin foam and carbon fiber fabric after impregnating with thermosetting resins−total weight of thermosetting resin foam and carbon fiber fabric before impregnating with thermosetting resins)/total weight of thermosetting resin foam and carbon fiber fabric after impregnating with thermosetting resins}×100; and
- (A4) compression rate={(thickness of thermosetting resin foam before compressing −thickness of core material)/thickness of core material}×100.

12. The method for manufacturing the fiber-reinforced molded product according to claim 11, wherein the compression rate of the thickness of thermosetting resin foam is 1000 to 2600%.

* * * * *